United States Patent
Akoum et al.

(10) Patent No.: US 10,257,835 B2
(45) Date of Patent: Apr. 9, 2019

(54) FACILITATING ENHANCED BEAM MANAGEMENT IN A WIRELESS COMMUNICATION SYSTEM

(71) Applicant: AT&T Intellectual Property I, L.P., Atlanta, GA (US)

(72) Inventors: Salam Akoum, Austin, TX (US); Arunabha Ghosh, Austin, TX (US); Xiaoyi Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 7 days.

(21) Appl. No.: 15/469,193

(22) Filed: Mar. 24, 2017

(65) Prior Publication Data
US 2018/0279286 A1  Sep. 27, 2018

(51) Int. Cl.
    H04W 72/04    (2009.01)
    H04W 74/08    (2009.01)
    H04W 24/10    (2009.01)
    H04W 24/04    (2009.01)
    H04W 88/08    (2009.01)

(52) U.S. Cl.
    CPC ........ *H04W 72/046* (2013.01); *H04W 24/04* (2013.01); *H04W 24/10* (2013.01); *H04W 72/042* (2013.01); *H04W 72/0486* (2013.01); *H04W 74/0833* (2013.01); *H04W 88/08* (2013.01)

(58) Field of Classification Search
    None
    See application file for complete search history.

(56) References Cited

U.S. PATENT DOCUMENTS

| 8,547,927 B2 | 10/2013 | Seo et al. |
| 9,203,502 B2 | 12/2015 | Seo et al. |
| 9,204,411 B2 | 12/2015 | Chen et al. |
| 9,451,639 B2 | 9/2016  | Li et al. |
| 9,537,548 B2 | 1/2017  | Thomas et al. |

(Continued)

FOREIGN PATENT DOCUMENTS

WO    2016153176    9/2016

OTHER PUBLICATIONS

Notice of Allowance dated Dec. 13, 2017 for U.S. Appl. No. 15/587,223, 24 pages.

(Continued)

*Primary Examiner* — Candal Elpenord
(74) *Attorney, Agent, or Firm* — Amin, Turocy & Watson, LLP

(57) ABSTRACT

Enhanced beam management for a wireless communication system is provided. In one example, a method comprises: determining, by a device comprising a processor, first beam information for a selected first beam of beams associated with a base station device, wherein the selected first beam is for downlink transmission; determining, by the device, second beam information for a selected second beam of the beams associated with the base station device, wherein the selected second beam is an alternative to the selected first beam for transmission of downlink data to the device, and the determining the second beam information is performed during a random access channel procedure; and transmitting, by the device, to a network device, the first beam information and the second beam information.

19 Claims, 10 Drawing Sheets

(56) References Cited

U.S. PATENT DOCUMENTS

| | | | |
|---|---|---|---|
| 9,549,417 B2 | 1/2017 | Olsson et al. | |
| 9,603,165 B2 | 3/2017 | Furuskog et al. | |
| 9,648,513 B2 | 5/2017 | Diachina et al. | |
| 2005/0215261 A1* | 9/2005 | Cha | H04B 7/0408 |
| | | | 455/452.2 |
| 2011/0243075 A1 | 10/2011 | Luo et al. | |
| 2013/0083774 A1* | 4/2013 | Son | H04W 36/0055 |
| | | | 370/331 |
| 2014/0010178 A1 | 1/2014 | Yu et al. | |
| 2014/0044074 A1 | 2/2014 | Chen et al. | |
| 2014/0376466 A1* | 12/2014 | Jeong | H04W 74/0833 |
| | | | 370/329 |
| 2015/0063203 A1 | 3/2015 | Kim et al. | |
| 2015/0208443 A1* | 7/2015 | Jung | H04B 7/0617 |
| | | | 370/329 |
| 2015/0334746 A1 | 11/2015 | Sun et al. | |
| 2016/0043781 A1 | 2/2016 | Cho et al. | |
| 2016/0119958 A1 | 4/2016 | Tan et al. | |
| 2016/0157267 A1 | 6/2016 | Frenne et al. | |
| 2016/0183234 A1 | 6/2016 | Sung et al. | |
| 2016/0198474 A1* | 7/2016 | Raghavan | H04W 72/0466 |
| | | | 370/335 |
| 2016/0249386 A1 | 8/2016 | Lyu et al. | |
| 2016/0301503 A1 | 10/2016 | Rico Alvarino et al. | |
| 2017/0006593 A1* | 1/2017 | Liu | H04W 16/32 |
| 2017/0026962 A1 | 1/2017 | Liu et al. | |
| 2017/0033854 A1 | 2/2017 | Yoo | |
| 2017/0048775 A1 | 2/2017 | Kim | |
| 2017/0141833 A1 | 5/2017 | Kim et al. | |
| 2017/0302355 A1* | 10/2017 | Islam | H04B 7/0639 |
| 2017/0325057 A1* | 11/2017 | Zhang | H04W 4/02 |
| 2017/0332407 A1* | 11/2017 | Islam | H04W 52/242 |
| 2017/0346545 A1 | 11/2017 | Islam et al. | |
| 2018/0070380 A1* | 3/2018 | Nagaraja | H04W 16/28 |
| 2018/0092156 A1* | 3/2018 | Kim | H04W 76/046 |
| 2018/0124724 A1 | 5/2018 | Tsai et al. | |

OTHER PUBLICATIONS

Office Action dated Jul. 24, 2018 for U.S. Appl. No. 15/925,822, 20 pages.

* cited by examiner

FACILITATING ENHANCED BEAM MANAGEMENT IN A WIRELESS COMMUNICATION SYSTEM

TECHNICAL FIELD

The subject disclosure relates generally to communications systems, and, for example, to systems, methods and/or machine-readable storage media for facilitating enhanced beam management for a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
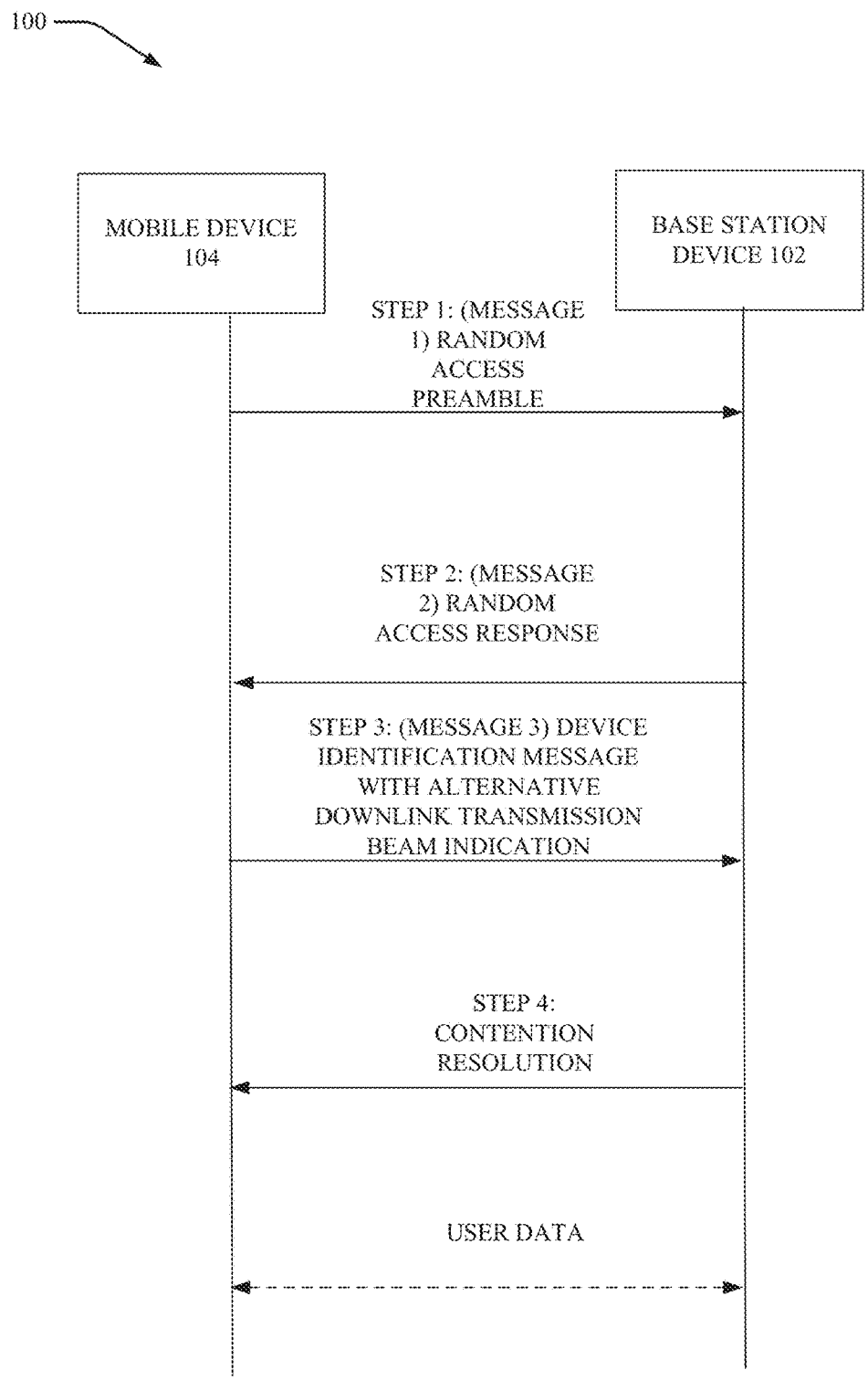
FIG. 1 illustrates an example, non-limiting message sequence flow chart to facilitate enhanced beam management for a wireless communication system in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)," "gNB" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

To meet the huge demand for data centric applications, currently 3GPP is looking towards extending the current 4G standards to 5G. However, there are numerous challenges and/or issues that are expected to arise. As used herein, "5G" can also be referred to as New Radio (NR) access. One or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE. Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink (DL) assignment index, precoding matrix index and/or number of layers.

Systems, methods and/or machine-readable storage media for facilitating enhanced beam management in a wireless communication system are provided herein. In one embodiment, a method comprises: determining, by a device comprising a processor, first beam information for a selected first beam of beams associated with a base station device, wherein the selected first beam is for DL transmission; and determining, by the device, second beam information for a selected second beam of the beams associated with the base station device, wherein the selected second beam is an alternative to the selected first beam for transmission of DL data to the device, and wherein the determining the second beam information is performed during a random access channel procedure. The method can also provide transmitting, by the device, to a network device, the first beam information and the second beam information. As will be noted herein, the "second beam information" is not limited to being information associated with a single beam. Rather, in some embodiments, the term "second beam information" and "selected second beam" can mean or include multiple second beams (e.g., multiple alternative beams").

In another embodiment, a machine-readable storage medium is provided. The machine-readable storage medium can comprise executable instructions that, when executed by a processor, facilitate performance of operations. The operations can comprise: determining first beam information for a selected first beam of beams associated with a base station device, wherein the selected first beam is for DL transmission; and determining second beam information for a selected second beam of the beams associated with the base station device, wherein the selected second beam is an alternative to the selected first beam for transmission of DL data to a device, and wherein the determining the second beam information is performed during a random access channel procedure. The operations can also comprise transmitting, to a network device, the first beam information and the second beam information.

In yet another embodiment, another method is provided. The method can comprise: transmitting, by a base station device comprising a processor, during a synchronization signal burst time period, synchronization signal blocks for selection of a selected first beam of beams for downlink transmission to the device by the base station device; transmitting, by the base station device, the synchronization signal blocks for selection of a selected second beam of the beams for the downlink transmission, wherein the selected second beam is an alternative for the downlink transmission to the device by the base station device; and receiving, by the base station device, the selected first beam and the selected second beam, wherein the receiving the selected second beam is via a message identifying the device.

One or more embodiments can facilitate providing a reliable coarse beam management and/or can be employed for control channel beam management and beam switching. In some embodiments, such increased reliability in control channel beam management is not only applicable for Enhanced Mobile Broadband (eMBB) service but also for applications requiring high reliability. One or more embodiments can be applicable to help the BS devices decide on the DL transmission beam, such that the mobile device has better visibility of the measured beams and the mobile device can report back to the network so that the network can decide on which beam to use and/or to which beam to switch the mobile device communication. As used herein, in various embodiments, the term "downlink transmission beam" can be or mean "downlink transmit beam" ("DL Tx beam").

FIG. 1 illustrates an example, non-limiting message sequence flow chart to facilitate enhanced beam management for a wireless communication system (e.g., system 100) in accordance with one or more embodiments described herein. In some embodiments, the system 100 can facilitate alternative beam indication in random access channel (RACH) resources for control channel beam management. One or more embodiments of the system 100 described herein can provide an enhanced initial beam management procedure by indicating one or more alternative DL transmission beams from the BS device 102 to the mobile device 104 during the RACH procedure. In some embodiments, the beam management can be coarse beam management and a mobile device 104 assisted beam indication at the mobile device during the RACH procedure.

While the system 100 shows a single BS device 102 and a single mobile device 104, in various embodiments, multiple BS devices and/or multiple mobile devices can be included in system 100. All such embodiments are envisaged.

With reference to FIG. 1, one or more of reference signals and/or pilot signals can be transmitted within the system 100. The reference signals and/or the pilot signals can be beamformed or non-beamformed. In FIG. 1, shown is a typical message sequence chart for random access procedure in wireless communication systems. In some embodiments, the wireless communication system can be a 5G system, although such is not required. As used herein, the term "random access" can mean the procedure for the mobile device 104 to request a connection setup from the BS device 102. Random access can be employed for initial access to the BS device 102 by the mobile device 104 in some embodiments. For example, random access can be employed to facilitate the mobile device 104 moving from radio resource control (RRC)_idle state to RRC_connected state.

In some embodiments, the random access can be employed to re-establish a connection between the mobile device 104 and one or more BS devices (e.g., BS device 102) after failure of a link (e.g., communication channel between the mobile device 104 and a BS device), for handover of the mobile device 104, etc.

Referring to FIG. 1, as shown, in step 1, the mobile device 104 can transmit a first message to the BS device. The first message can include a random access preamble for the BS device 102 and/or network to estimate the mobile device 104 timing and/or establish uplink synchronization. In the message 2, the BS device 102 and/or network can then transmit a random access response. The random access preamble can include, but is not limited to, a timing advance command to adjust the mobile device 104 transmit timing. In some embodiments, the BS device 102 and/or network can assign uplink resources for the mobile device 104 to use for the device identification message shown in step 3.

When the mobile device 104 tries to connect to a BS device (e.g., BS device 102) and/or a network in general, there are uplink (UL) beams that are used for reception from the mobile device 104 to the BS device 102 and there are DL beams that are used for transmission to the mobile device from the BS device 102 based on the mobile device 104 and the BS device 102 performing a synchronization procedure. Accordingly, the mobile device 104 can detect a number of DL beams and can select from any number of different DL beams for one or more beams on which to receive DL transmission. In some embodiments, the mobile device 104 can select at least one beam and an alternative beam. The beams selected can be DL beams that have the best signal strength or power received at the mobile device 104 and/or that have a signal strength or power received at the mobile device 104 that at least exceeds or is substantially equal to a defined threshold. This selection of the alternative beams can be indicated in message 3 of the system 100.

For example, in message 3, the mobile device 104 can employ the uplink physical uplink shared channel (PUSCH) to transmit the identity of the mobile device 104 to the BS device 102 and/or to the network. For example, the identity can be transmitted in a device identity message and/or any resource of the message 3.

As such, in some embodiments, the content of message 3 can depend on the state of the mobile device 104. In some embodiments, the mobile device 104 can measure and/or report one or more alternative beams in message 3 of the RACH procedure and the BS device 102 and/or network can switch between the first beam indicated by the mobile device 104 and the one or more alternative beams indicated by the mobile device 104. In particular, in some embodiments, the mobile device 104 measures the received power whenever synchronization signal (SS) blocks (which include the beams) are received by the mobile device 104. The SS blocks are sent periodically by the network and are not sent on demand.

Figure 2:
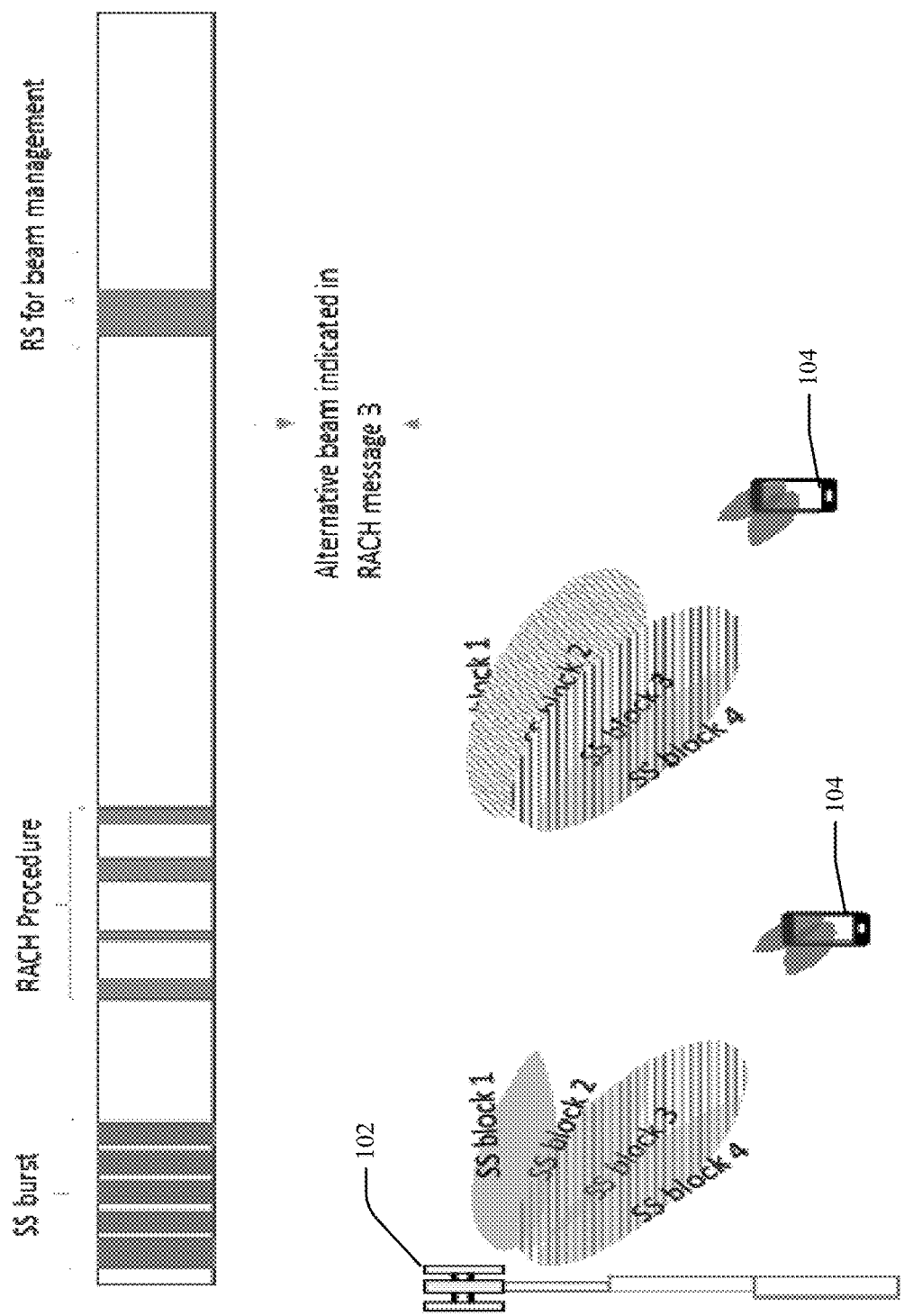
FIG. 2 illustrates an example, non-limiting diagram of a framework illustrating the identification of alternative beams for enhanced beam management for a wireless communication system in accordance with one or more embodiments described herein.

It is to be noted that the selection of the beams by the mobile device 104 is not necessarily done in the RACH procedure. Rather, the reporting from the mobile device 104 to the base station device 102 can be performed during the RACH procedure. With reference to FIGS. 1 and 2, the reporting of the initial/first beam by the mobile device 104 can be performed during step 1 of the RACH procedure, but implicitly (e.g., the BS device 102 can infer the information about the initial/first beam selected by the mobile device 104 from the resources used to transmit the message 1 of the RACH procedure described and shown in FIG. 1).

By contrast, again with reference to FIGS. 1 and 2, the reporting of the second beam information by the mobile device 104 is performed in step 3 of the RACH procedure and is done explicitly in the sense that information about this beam is sent in the payload of the message 3 in step 3 of FIG. 1.

Control channel beam switching, performed and/or initiated by the BS device 102, can be provided if it is determined that the first beam has unacceptable signal strength and/or received power at the mobile device 104. In some embodiments, the mobile device 104 can detect the received power and/or signal strength and transmit information to the BS device 102 notifying the BS device 102 and/or requesting a change to another (or the alternative) beam. In some embodiments, the BS device 102 can employ other methods to determine the signal strength and/or received power of the beam at the mobile device 104.

Accordingly, in one or more embodiments, the selection by the mobile device 104 can be beam-based as opposed to cell-based. In beam-based approaches there can be greater directionality and corresponding benefits of the same since there can be multiple smaller beams than for the case of the 3-sector cell-based approach, and the mobile device 104 can select a smaller beam within a particular cell sector, for example as there can be multiple beams being transmitted from a single cell sector of a BS device (e.g., BS device 102).

In some embodiments, in message 4, the BS device 102 and/or network can transmit a contention resolution message on the DL physical downlink shared channel (PDSCH) if there is a contention due to multiple mobile devices trying to access the BS device 102 and/or network. After contention resolution, as shown, the user data associated with the mobile device 104 can be transmitted and/or received.

Accordingly, in some embodiments, all four messages can be transmitted on the same DL beam that the mobile device 104 selected. However, in one or more embodiments described herein, the mobile device 104 can transmit to the network or BS device 102, information (e.g., a report) indicating an alternative beam at the mobile device 104. The alternative beam can be a beam that also has a defined signal strength level (e.g., acceptable or good signal strength as received at the mobile device 104). The mobile device 104 can transmit information identifying the one or more alternative beams in the message 3 device identification message.

In one or more embodiments, the (coarse) beam management procedure can be enhanced by indicating/reporting alternative DL transmission beams in the RACH procedure. In particular, the mobile device 104 can measure one or more beams and report, in message 3 resources of the RACH procedure, the alternative beams selected such that the BS device 102 and/or the network can use one or more of the indicated alternative beams for control channel beam switching.

FIG. 2 illustrates an example, non-limiting diagram of a framework illustrating the identification of alternative beams for enhanced beam management for a wireless communication system in accordance with one or more embodiments described herein. Repetitive description of like elements employed in other embodiments described herein is omitted for sake of brevity.

In one or more embodiments described herein, enhancement of the initial beam management procedure can be provided via indicating/reporting by the mobile device 104 to the BS device 102 one or more alternative DL transmission beams during the RACH procedure, for the BS device 102 to use while transmitting to the mobile device 104. For example, system 200 can show alternative beam indication in RACH resources for control channel beam management.

In some embodiments, system 200 can be a beam-based system. Beam management can be one or more procedures to acquire and maintain one or more BS devices (e.g., BS device 102) and/or mobile device beams that can be used for DL and UL transmission and reception. One coarse beam management procedure described with reference to FIGS. 1, 2 and/or 3 can enable measurement by the mobile device 104 on different BS device 102 transmit beams to support selection of BS device 102 transmit beams and mobile device 104 receipt of beams.

Control channel beam switching at the BS device 102 can occur when the identified beam to the mobile device 104, identified during the beam management procedure (e.g., coarse beam management procedure) falls below a certain threshold, and another beam is identified as providing better received signal quality to the mobile device 104. Identifying another DL transmission beam to serve a certain mobile device can be important to increase the reliability of the control channel, and avoid or reduce the likelihood of beam failure.

As used herein, "initial access" can mean the access that allows a mobile device (e.g., mobile device 104) to establish and/or maintain communication with a BS device (e.g., BS device 102) and/or a network. Although the term "initial" is employed, in some embodiments, the access need not be the first ever access and/or the first access upon power up of a mobile device. For example, initial access can mean the access to a network that a mobile device 104 makes (or attempts to make) with a particular BS device or network device (whether for the first time ever or after being disconnected from the BS device and/or the network device for any amount of time).

In some embodiments described herein, initial beam management for control channels can identify a DL transmission beam at the BS device 104 from the initial access SS blocks or measurement reference signals, such that one DL transmission beam is identified for UE measurements and subsequently used for control channel signaling. In the event of beam failure—when the quality of the beam pair link of an associated control channel falls below a certain threshold—a beam failure procedure can be triggered by the BS device 104 to identify a new potential beam to the serving cell, and subsequently, beam recovery can be established using the new beam. In the embodiments described herein, the mobile device 104 identifies one or more alternative beams to facilitate this process. Establishing beam diversity through indicating alternative measured beams can decrease the potential of beam failure, and/or allow for higher reliability on the control channels, and lower latency in beam switching to another beam pair link when an alternative beam measured at the mobile device 102 is already indicated to the BS device 104.

As shown in FIG. 2, there are several different time periods during which the system 200 can facilitate and/or employ enhancement of initial beam procedure. The synchronization signal (SS) time period can be the time period during which one or more SS blocks of information (e.g., SS block 1, SS block 2, SS block 3, SS block 4) can be transmitted on the DL from the BS device to the mobile device 102. The SS blocks of information can be received by the mobile device 104. The mobile device 104 can, in some embodiments, receive the SS blocks 1, 2, 3 and 4, at different time periods, in overlapping time periods or in non-overlapping time periods.

It is noted that the transmission of SS-blocks is periodic from the network. The SS-blocks are not configured by the network, but actually periodically sent from the network. Further, the SS can be sent periodically and are not sent on demand from any device in the system.

The SS blocks of information can be transmitted in one or more DL beams. For example, the SS block 1 can be transmitted in a first DL beam, the SS block 2 can be transmitted in a second DL beam, the SS block 3 can be transmitted in a third DL beam, the SS block 4 can be transmitted in a fourth DL beam.

In some embodiments, the SS can be or include primary synchronization signals (PSS), secondary synchronization signals (SSS) and/or physical broadcasting channel (PBCH), which can be transmitted within a SS block. One or multiple SS blocks can comprise an SS burst. One or multiple SS bursts can comprise an SS burst set where the number of SS bursts within an SS burst set is finite. During the initial access procedure, the mobile device 102 can select the SS block corresponding to the BS device 102 transmission beam that results in the highest RSRP towards the mobile device 104. This same beam can then used to acquire subsequent control information.

In some embodiments, the mobile device 104 can determine whether there is unacceptable signal strength and/or power in one or more of the received DL beams. For example, in some embodiments, the mobile device 104 monitors information associated with the beam/SS block of information. In some embodiments, the information monitored can be the synchronization signal (SS)-block-Reference Signal Received Quality (RSRP) for example. The mobile device 104 can measure the SS-block-RSRP, by scanning one or more (or all) SS-blocks. The SS-blocks can be sent in DL beams transmitted periodically from the BS device 102 to the mobile device 104.

The mobile device 104 can determine which SS-blocks can result in the one or more beams having the best quality (or beam quality that exceeds or is substantially equal to a defined threshold). In some embodiments, the mobile device 104 can measure the beam in terms of RSRP. As shown in FIG. 2, system 200 can include a RACH procedure such as that described with reference to system 100 of FIG. 1. During the RACH procedure, the mobile device 104 can generate information and/or a report identifying the one or more SS blocks of information that are selected as the one or more best beams. One beam can be an alternative beam to the initial/first beam identified in some embodiments. This reporting can be provided in message 3 of system 100 and can be explicit in the sense that the beam identifier can be conveyed to the BS device 102 in message 3 payload explicitly.

In further details, when the mobile device 104 tries to connect to a BS device (e.g., BS device 102) and/or a network in general, there are uplink (UL) beams that are transmitted from the mobile device 104 to the BS device 102 and there are DL beams that are transmitted to the mobile device from the BS device 102 based on the mobile device 104 and the BS device 102 performing a synchronization procedure (shown as "SS burst" of system 200). Accordingly, the mobile device 104 can detect a number of DL beams (shown as SS blocks 1, 2, 3, 4) and can select from any number of different DL beams for one or more beams on which to receive DL transmission. In some embodiments, the mobile device 104 can select at least one beam and an alternative beam. The beams selected can be DL beams that have the best signal strength or power received at the mobile device 104 and/or that have a signal strength or power received at the mobile device 104 that at least exceeds or is substantially equal to a defined threshold. This selection can be indicated in message 3 of the system 100.

For example, in message 3, the mobile device 104 can employ the uplink physical uplink shared channel (PUSCH) to transmit the identity of the mobile device 104 to the BS device 102 and/or to the network. For example, this can be a report by the mobile device 104 to the BS device 102. As such, in some embodiments, the content of message 3 can depend on the state of the mobile device 104. In some embodiments, the mobile device 104 can measure one or more beams and/or, in message 3 of the RACH procedure, report one or more alternative beams. The BS device 102 and/or network can switch between the first beam indicated by the mobile device 104 and the one or more alternative beams indicated by the mobile device 104. Such control channel beam switching, performed and/or initiated by the BS device 102, can be provided if it is determined that the first beam has unacceptable signal strength and/or received power at the mobile device 104. In some embodiments, the mobile device 104 can detect the received power and/or signal strength and transmit information to the BS device 102 notifying the BS device 102 and/or requesting a change to another (or the alternative) beam. In some embodiments, the BS device 102 can employ other methods to determine the signal strength and/or received power of the beam at the mobile device 104.

In some embodiments, if the information measured by the mobile device 104 indicates that the signal strength and/or power (e.g., RSRP) of the DL beam at the mobile device 104 decreases to or is detected to be a level under a defined threshold, the BS device 102 can initiate an event for beam recovery and/or initiate beam switching from the initial/first beam to the alternative beam.

In the example shown in FIG. 2, SS block 3 is measured at the mobile device 104 and indicated to the BS device 104 as the beam to be used for control channel beam signaling. One or more alternative beams can also be indicated by the mobile device 104. For example, the beam corresponding to SS block 2 can be next measured at the mobile device 104. The mobile device 104 can report the one or more alternative beams in message 3 payload to be used as an alternative one or more DL transmission beams at the BS device 102. The one or more alternative beams can be indicated using the RACH resources of message 3 of the RACH procedure in some embodiments. The alternative beam can be used in lieu or as a switch-to beam in case the beam identified during initial access (e.g., in this case, SS block 3) falls below a certain threshold.

The RACH procedure shown in FIG. 2 can employ the DL transmission beam chosen at the mobile device 104 using the selected beam/SS block for random access preamble and response described in FIG. 1. The mobile device 104 transmission beam for preamble transmission is selected by the mobile device 102. At the BS device 102, the DL transmission beam for message 2 of FIG. 1 can be obtained based on the detected RACH preamble, and can be the same beam established during the initial access procedure based on SS blocks. The UL transmission beam for message 3 transmission can be determined by the mobile device 104, and can be the same transmit beam used for message 1 (RACH preamble) transmission in some embodiments, although need not be so.

Figure 3:
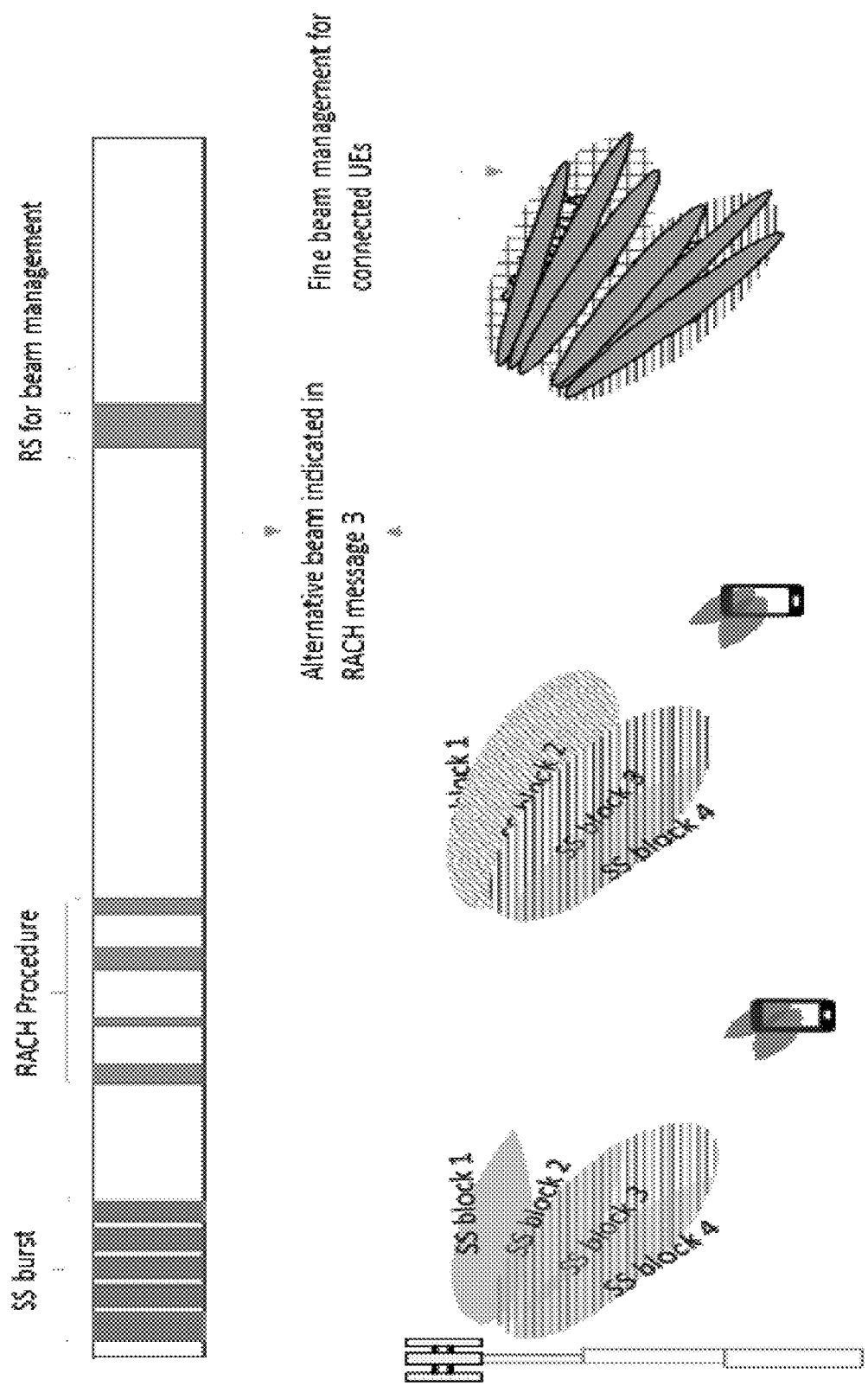
FIG. 3 illustrates another example, non-limiting diagram of a framework illustrating the identification of alternative beams for enhanced beam management for a wireless communication system in accordance with one or more embodiments described herein.

FIG. 3 illustrates another example, non-limiting diagram of a framework illustrating the identification of alternative beams for enhanced beam management for a wireless communication system in accordance with one or more embodiments described herein. Repetitive description of like elements employed in other embodiments described herein is omitted for sake of brevity.

Finer beam management for connected UEs and data channels can then follow using other reference signals, based on the two identified beams in the coarse beam management procedure. Control channel beam switching can be based on the alternative beam indicated in message 3. This reporting can be for finer beam management in some embodiments. Finer beam management can enable mobile device 104 measurement on different BS device 102 transmission beams to possibly change intra or inter BS device 102 transmit beams. Finer beam management can select from a possibly smaller set of beams for beam refinement than in coarse beam management, which was described with reference to FIG. 2 system 200. Finer beam management can be a special case of coarse beam management. For beam management, system 200 and/or system 300 can support using the same or different beams on the control channel and the corresponding data channel transmissions in various embodiments.

As shown in FIG. 3, for other reference signals configured for connected mobile devices for beam management, the reporting from the mobile device can be aperiodic and/or BS device 102 or network triggered.

Figure 4:
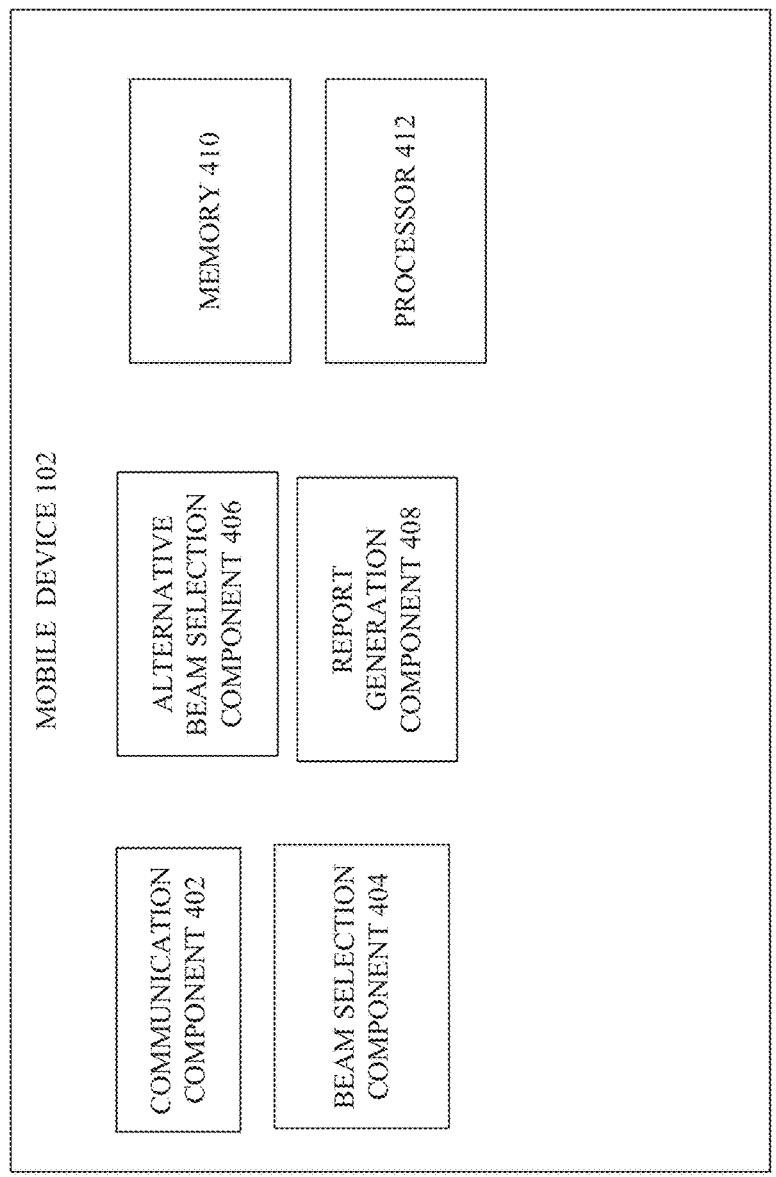
FIG. 4 illustrates an example, non-limiting block diagram of a mobile device for which enhanced beam management can be facilitated in accordance with one or more embodiments described herein.
Figure 5:
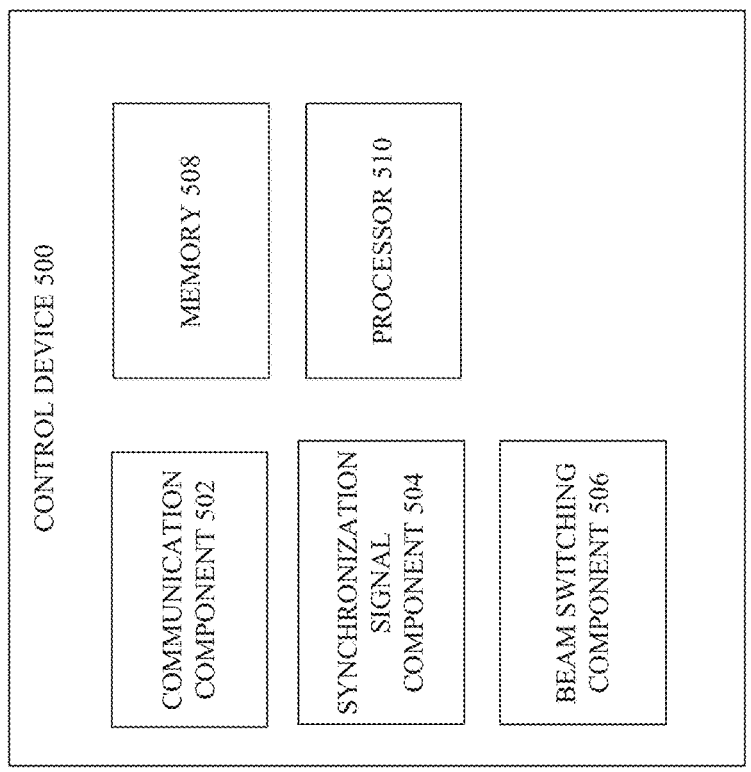
FIG. 5 illustrates an example, non-limiting block diagram of a control device facilitating enhanced beam management in accordance with one or more embodiments described herein.

FIG. 4 illustrates an example, non-limiting block diagram of a mobile device for which enhanced beam management can be facilitated in accordance with one or more embodiments described herein. FIG. 5 illustrates an example, non-limiting block diagram of a control device facilitating enhanced beam management in accordance with one or more embodiments described herein. Repetitive description of like elements employed in other embodiments described herein is omitted for sake of brevity.

Mobile device 102 can comprise communication component 402, beam selection component 404, alternative beam selection component 406, report generation component 408, memory 410 and/or processor 412. In various embodiments, one or more of the comprise communication component 402, beam selection component 404, alternative beam selection component 406, report generation component 408, memory 410 and/or processor 412 can be electrically and/or communicatively coupled to one another to perform one or more functions of mobile device 102.

Control device 500 can be or be included in BS device 102 (or another network device) in some embodiments. Control device 500 can comprise a communication component 502, synchronization signal component 504, beam switching component 506, memory 508 and/or processor 510. In one or more embodiments, one or more of communication component 502, synchronization signal component 504, beam switching component 506, communication protocol component 508, memory 508 and/or processor 510 can be electrically and/or communicatively coupled to one another to perform one or more functions of the control device 500 (and/or the BS device 102).

The communication component 402 of the mobile device 104 can receive one or more messages (messages described with reference to systems 100, 200 and/or 300) from the communication component 502 of one or more BS devices (e.g., BS device 104) and/or network devices. In some embodiments, during the synchronization stage in which the mobile device 104 and BS device 102 are synchronizing, the synchronization signal component 504 of the BS device 102 can generate one or more DL beams and/or synchronization information for transmission to the mobile device 104.

In some embodiments, the communication component 402 can receive and/or transmit one or DL and/or UL beams from and/or to the communication component 502 during random access, synchronization with the BS device 102 or the like.

During synchronization between the mobile device 104 and the BS device 102, the mobile device 104 beam selection component 404 and/or the alternative beam selection component 406 can detect and/or receive and/or process one or more DL beams to determine the signal strength and/or the power of the received DL beam. The beam selection component 404 can select a first beam for DL transmission from the BS device 102 to the mobile device. The alternative beam selection component 406 can detect and/or receive and/or process one or more DL beams and select one or more of the received DL beams as an alternative beam to use for DL transmission from the BS device 102. The report generation component 408 of the mobile device 104 can generate a report identifying the first beam to use and/or the alternative beam to use. While the embodiments may use the term "first" relative to "first beam," in some embodiments, the BS device 102 can initially use the alternative beam and switch to the "first" beam if the received signal strength and/or power at the mobile device 104 is not satisfactory (as opposed to the converse of starting with the "first" beam and switching to the alternative beam). All such embodiments are envisaged.

Based on a determination by the BS device 102 and/or receipt of information indicating the signal strength and/or received power of the initial beam employed on the DL from the BS device 102 to the mobile device 104 is not satisfactory (or has a signal strength or received power at the mobile device 104 that is less than a defined acceptable threshold), in some embodiments, the beam switching component 506 of the BS device 102 can switch to the alternative from the first beam (or from the alternative to the "first" beam as indicated above).

The memory 410 can store instructions that can be executed by processor 412 to select one or more DL beams (e.g., initial/first beams and/or alternative beams), provide a report in message 3 of system 100, detect and/or measure the signal strength and/or power of the DL beams or the like. The memory 508 can store instructions that can be executed by processor 510 to receive information for selection of one or more DL beams (e.g., initial/first beams and/or alternative beams), transmit over such selected beams, perform switching to an alternative beam or an initial/first beam from the alternative beam, estimate or process information or notifications regarding the signal strength and/or power of the DL beams or the like.

FIGS. 6, 7, 8 and 9 illustrate flowcharts of methods facilitating enhanced beam management in accordance with one or more embodiments described herein. Repetitive description of like elements employed in other embodiments described herein is omitted for sake of brevity.

Figure 6:
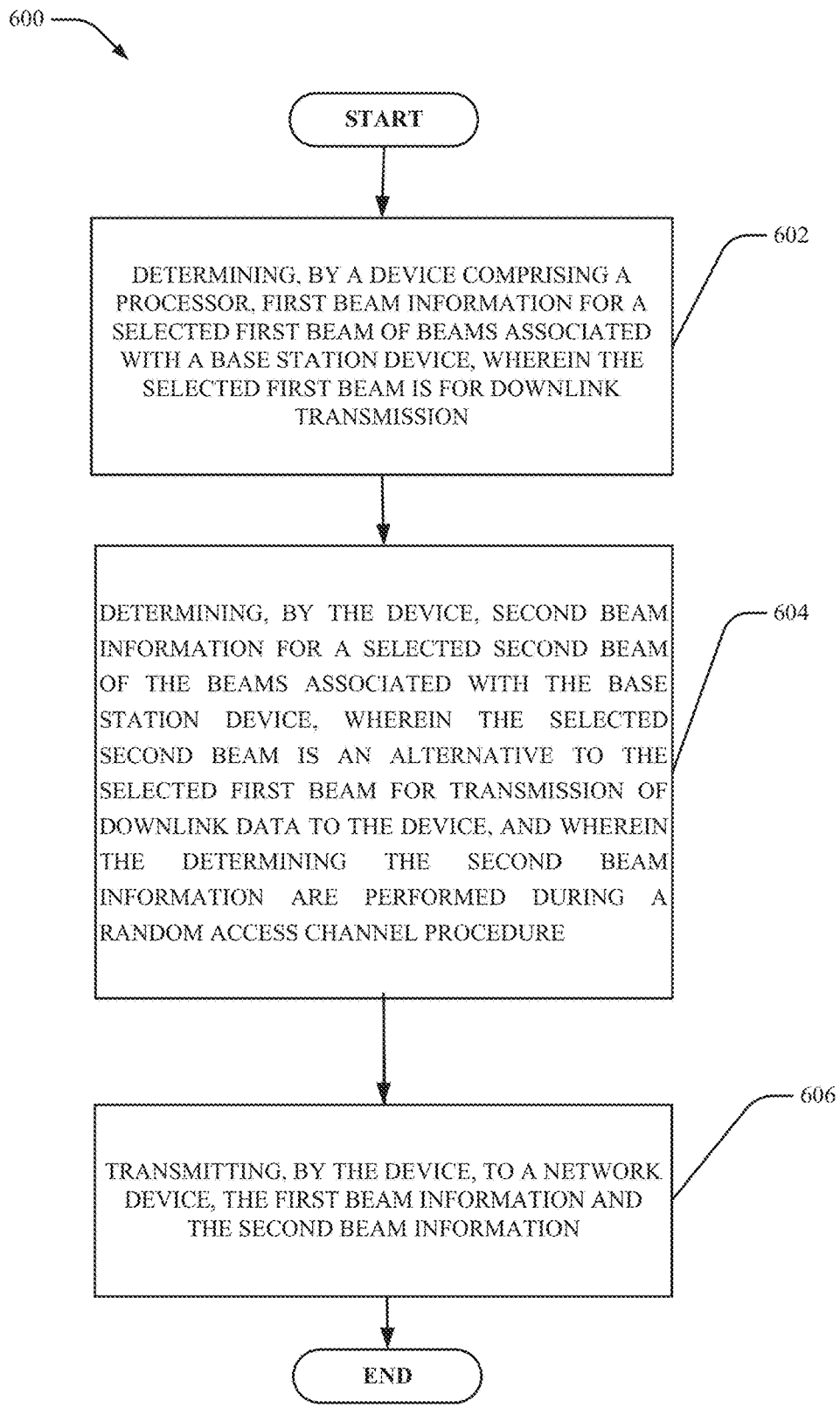
FIGS. 6, 7, 8 and 9 illustrate flowcharts of methods facilitating enhanced beam management in accordance with one or more embodiments described herein.

Turning first to FIG. 6, at 602, method 600 can comprise determining, by a device (e.g., mobile device 104) comprising a processor, first beam information for a selected first beam of beams associated with a base station device (e.g., BS device 102), wherein the selected first beam is for downlink transmission. In some embodiments, the determining the selected first beam comprises selecting a synchronization signal block that results in a highest received power of a reference signal received by the device.

At 604, method 600 can comprise determining, by the device, second beam information for a selected second beam of the beams associated with the base station device, wherein the selected second beam is an alternative to the selected first beam for transmission of downlink data to the device, and wherein the determining the second beam information are performed during a random access channel procedure. As will be noted herein, the "second beam information" is not limited to being information associated with a single beam. Rather, in some embodiments, the term "second beam information" and "selected second beam" can mean or include multiple second beams (e.g., multiple alternative beams").

In some embodiments, the selected second beam information is employed by the base station device for control channel beam switching. In some embodiments, the control channel beam switching is performed to switch the device from the selected first beam to the selected second beam based on a determination that a power of the selected first beam satisfies a defined criterion. In some embodiments, the defined criterion comprises a criterion of whether the power is below a defined threshold.

In some embodiments, determining the second beam information comprises measuring signal strengths of the beams, and wherein the transmitting the second beam information comprises transmitting the second beam information in a message employed to transmit identity information for the device on an uplink channel to a network device. In one or more embodiments, the random access channel procedure comprises a procedure to re-establish a connection for the device after failure of a communication channel to which the device was connected, and wherein the connection is for handover of the device from the communication channel.

At 606, method 600 can comprise transmitting, by the device, to a network device, the first beam information and the second beam information. In some embodiments, transmitting the second beam information comprises transmitting the second beam information.

Figure 7:
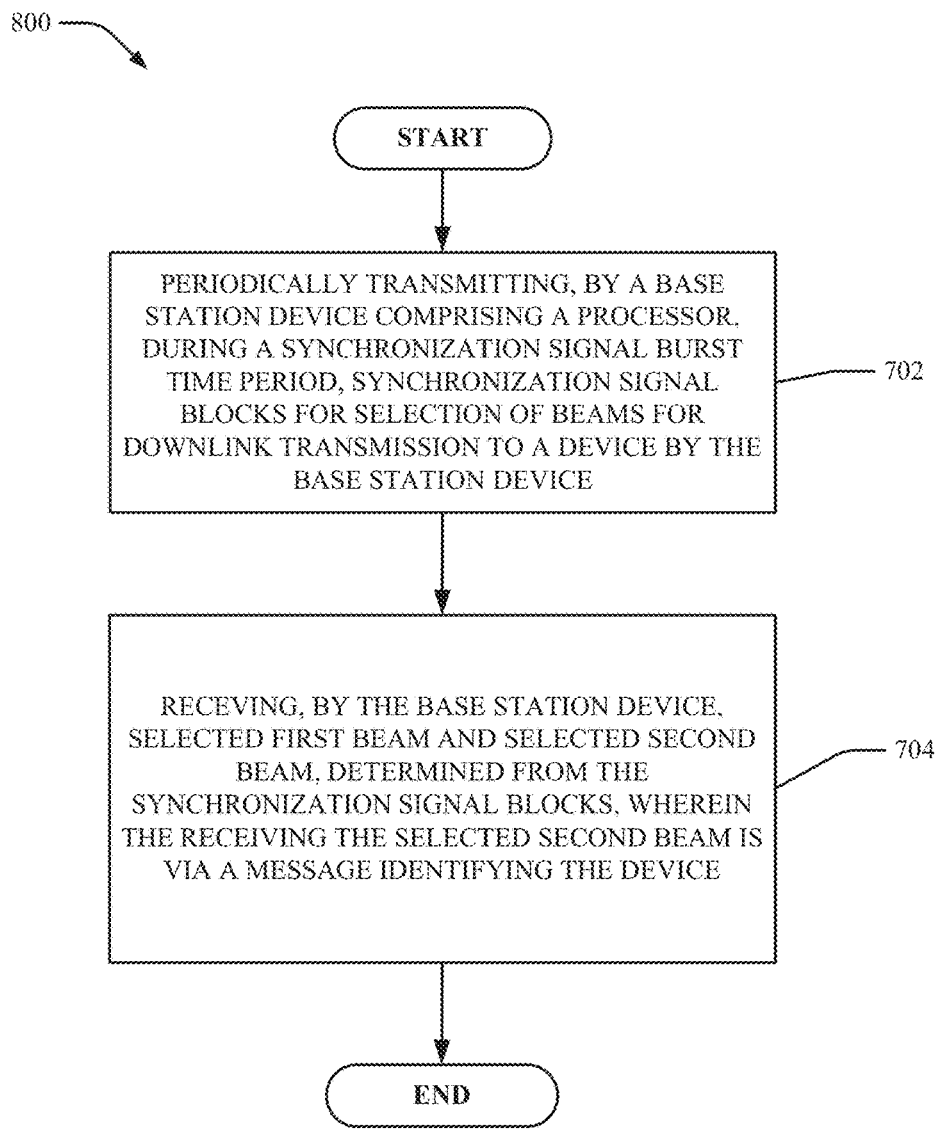

Turning now to FIG. 7, at 702, method 700 can comprise periodically transmitting, by a base station device comprising a processor, during a synchronization signal burst time period, synchronization signal blocks for selection of beams for downlink transmission to the device by the base station device. At 704, method 700 can comprise receiving, by the base station device, selected first beam and selected second beam, determined from synchronization signals blocks, wherein the receiving the selected second beam is via a message identifying the device.

Figure 8:
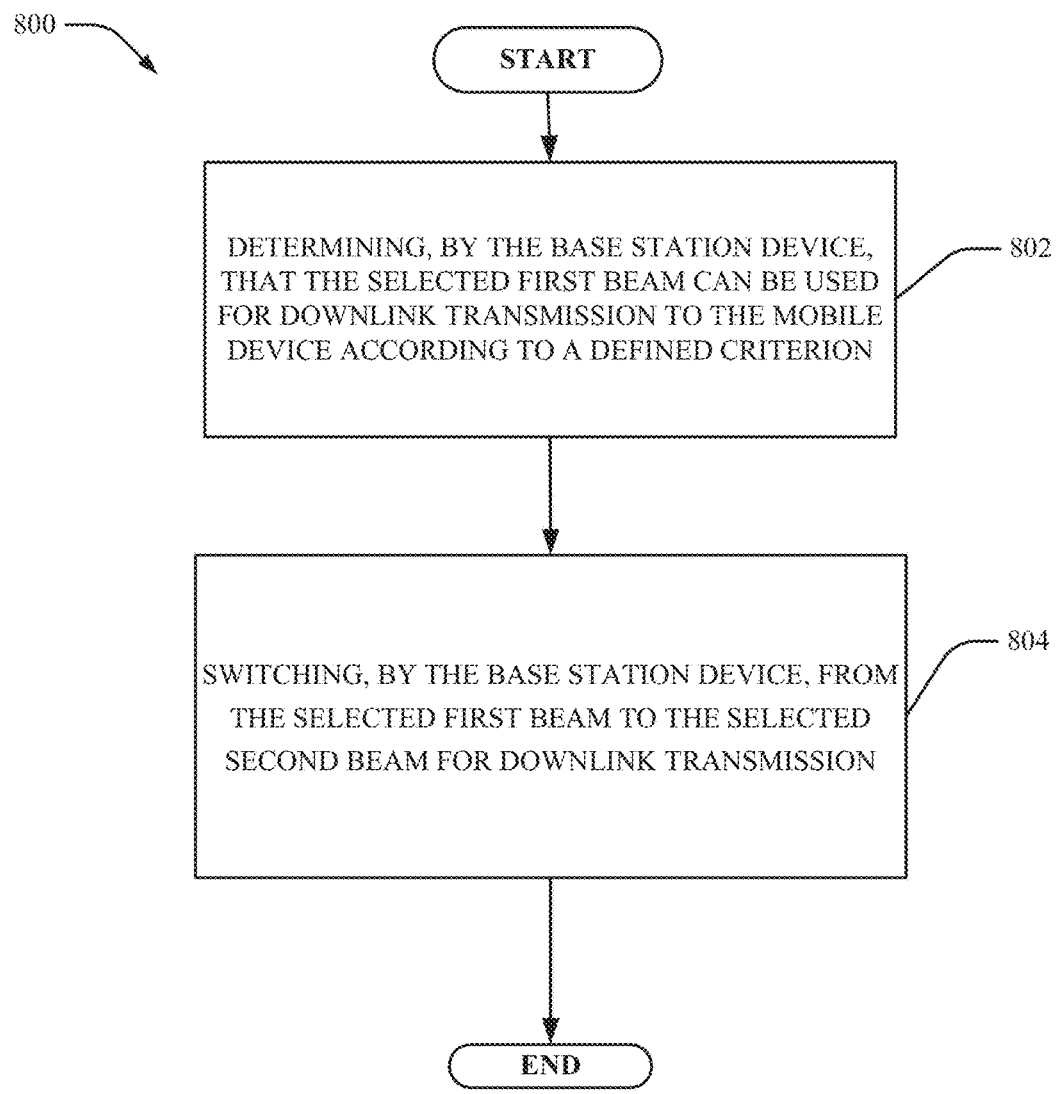

Turning now to FIG. 8, at 802, method 800 can comprise determining, by the base station device, that the selected second beam can be used for downlink transmission to the mobile device according to a defined criterion. At 804, method 800 can comprise switching, by the base station device, from the selected first beam to the selected second beam for the downlink transmission.

Figure 9:
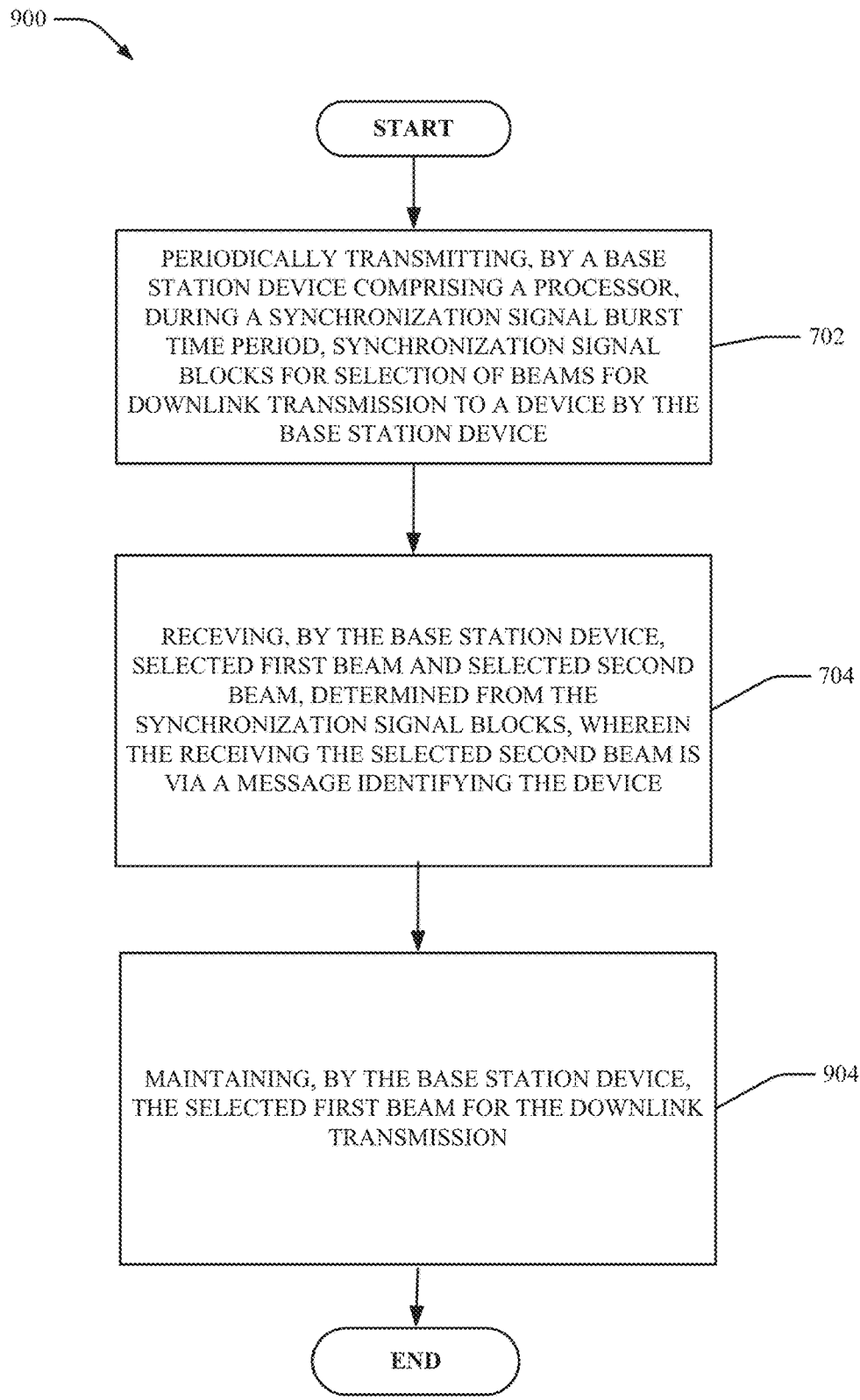

Turning now to FIG. 9, at 902, method 900 can be step 702 of method 700 while 904 of method 900 can be step 704 of method 700. At 906, method 900 can comprise maintaining, by the base station device, the selected first beam for the downlink transmission.

Figure 10:
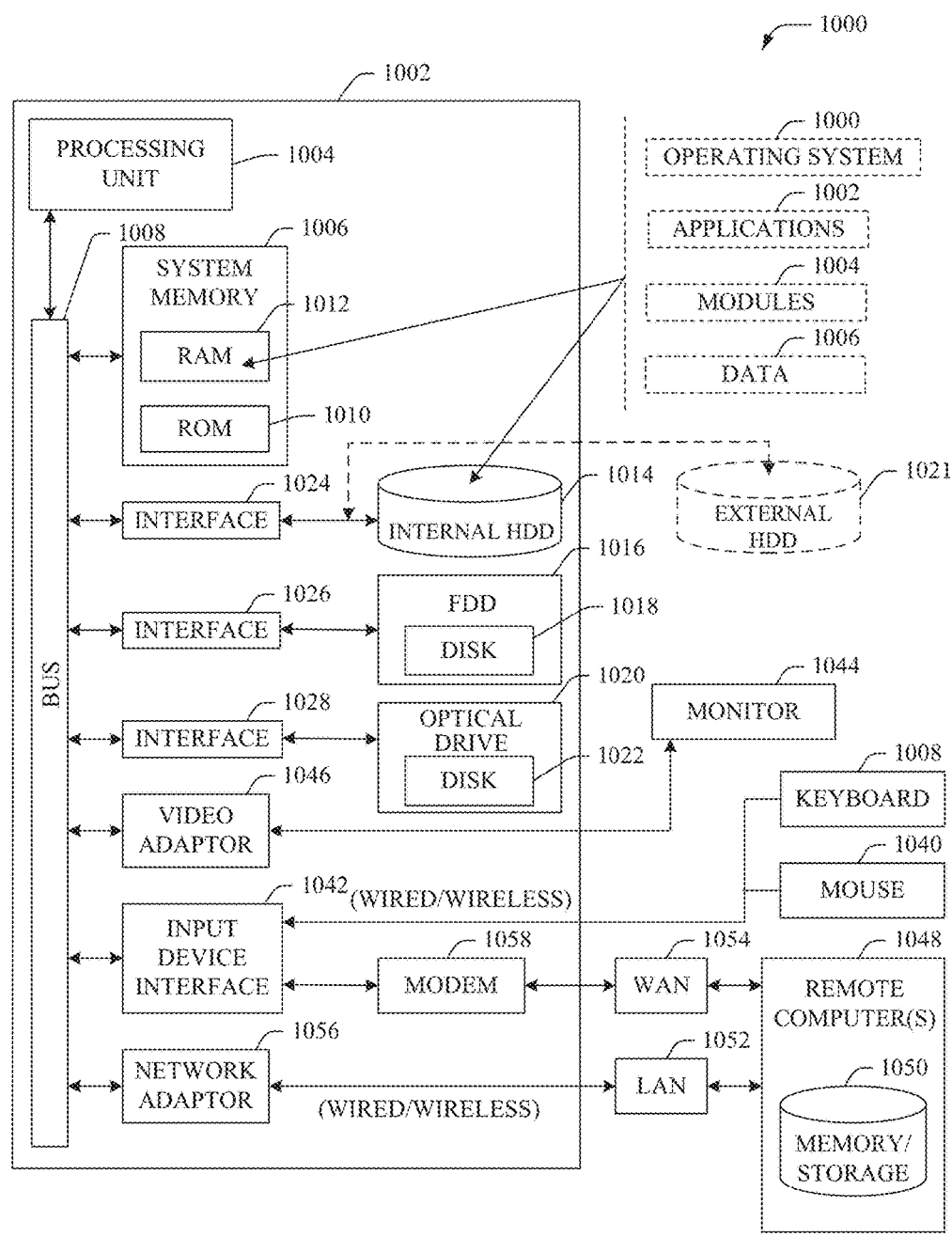
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, base station device 102 or mobile device 104 (or a component of base station device 102 or mobile device 104).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a device comprising a processor, first beam information for a selected first beam of beams associated with a base station device, wherein the selected first beam is for downlink transmission;
   determining, by the device, second beam information for a selected second beam of the beams associated with the base station device, wherein the selected second beam is an alternative to the selected first beam for transmission of downlink data to the device, and wherein the determining the second beam information is performed during a random-access channel procedure; and transmitting, by the device, the first beam information and the second beam information;
wherein the random-access channel procedure comprises a procedure to re-establish a connection for the device after failure of a communication channel to which the device was connected, and wherein the connection is for handover of the device from the communication channel.

2. The method of claim 1, wherein the transmitting the second beam information comprises transmitting the second beam information in a message comprising an identity of the device.

3. The method of claim 2, wherein the selected second beam is employed by the base station device for downlink transmission in the random-access procedure.

4. The method of claim 3, wherein the second beam information is used to switch the transmission for the selected first beam to the selected second beam based on the determination that the second beam satisfies a defined criterion, and wherein the defined criterion comprises a criterion of whether the power of the first beam is below a defined threshold, or the load of the first beam is greater than a defined load.

5. The method of claim 1, wherein the determining the second beam information comprises measuring signal strengths of the beams, and wherein the transmitting the second beam information comprises transmitting the second beam information in a message employed to transmit identity information for the device on an uplink channel.

6. The method of claim 1, wherein the determining the first beam information for the selected first beam comprises selecting a synchronization signal block that results in a highest received power of a reference signal received by the device.

7. A non-transitory machine-readable storage medium, comprising executable instructions that, when executed by a processor, facilitate performance of operations, comprising:
determining first beam information for a selected first beam of beams associated with a base station device, wherein the selected first beam is for downlink transmission;
determining second beam information for a selected second beam of the beams associated with the base station device, wherein the selected second beam is an alternative to the selected first beam for transmission of downlink data to a device, and wherein the determining and reporting of the second beam information are performed during a random-access channel procedure; and
transmitting, the first beam information and the second beam information; wherein the random-access channel procedure comprises a procedure to re-establish a connection for the device after failure of a communication channel to which the device was connected, and wherein the connection is for handover of the device from the communication channel.

8. The non-transitory machine-readable storage medium of claim 7, wherein the transmitting the second beam information comprises transmitting the second beam information in a device identity message.

9. The non-transitory machine-readable storage medium of claim 7, wherein the selected second beam is employed by the base station device for downlink transmission to the device from the base station device.

10. The non-transitory machine-readable storage medium of claim 9, wherein the second beam information is used to switch the transmission for the selected first beam to the selected second beam based on the determination that the second beam satisfies a defined criterion.

11. The non-transitory machine-readable storage medium of claim 10, wherein the defined criterion comprises a criterion of whether the load of the first beam is greater than a defined load.

12. The non-transitory machine-readable storage medium of claim 7, wherein the determining the second beam information comprises measuring signal strengths of the beams, and wherein the transmitting the second beam information comprises transmitting a message, comprising the second beam information and identity information for the device, on an uplink channel.

13. The non-transitory machine-readable storage medium of claim 7, wherein the random-access channel procedure comprises a procedure to re-establish a connection for the device after failure of a communication channel to which the device was connected, and wherein the device is transferred to the connection from the communication channel after the failure.

14. The non-transitory machine-readable storage medium of claim 7, wherein the determining the selected first beam comprises selecting a synchronization signal block that results in a highest received power of a reference signal received by the device.

15. An apparatus, comprising:
a processor; and
a memory that stores executable instructions that, when executed by the processor, facilitate performance of operations, comprising:
determining first beam information for a selected first beam of beams associated with a base station device, wherein the selected first beam is for downlink transmission;
determining second beam information for a selected second beam of the beams associated with the base station device, wherein the selected second beam is an alternative to the selected first beam for transmission of downlink data to the device, and wherein the determining the second beam information is performed during a random-access channel procedure; and
transmitting, by the apparatus, the first beam information and the second beam information; wherein the random-access channel procedure comprises a procedure to re-establish a connection for the device after failure of a communication channel to which the device was connected, and wherein the connection is for handover of the device from the communication channel.

16. The apparatus of claim 15, wherein the operations further comprise transmitting the second beam information in a message comprising an identity of the device.

17. The apparatus of claim 16, wherein the selected second beam is employed by the base station device for downlink transmission in the random-access procedure.

18. The apparatus of claim 17, wherein the second beam information is used to switch the transmission for the selected first beam to the selected second beam based on the determination that the second beam satisfies a defined criterion, and wherein the defined criterion comprises a criterion of whether the power of the first beam is below a defined threshold.

19. The apparatus of claim 15, wherein the determining the second beam information comprises measuring signal strengths of the beams.

* * * * *